3,142,571
METHOD FOR PRODUCING A SOYBEAN PROTEIN PRODUCT AND THE RESULTING PRODUCT
John Kitchel McAnelly, Park Forest, Ill., assignor to Swift & Company, Chicago, Ill., a corporation of Illinois
No Drawing. Filed Mar. 7, 1962, Ser. No. 177,966
8 Claims. (Cl. 99—14)

This invention relates to manufactured protein food products and to methods of making such products and, more particularly, to the production of edible, bland, highly nutritious protein derivatives obtained from vegetable sources.

With the increased emphasis on the nutritional aspects of various food materials, "high-protein" products have received considerable attention. High-protein meat dishes, cereals, meat loaves, hamburger, dehydrated foods, sausages, baked goods, gravies, sauces, soups, casseroles and the like have increased in popularity to the point where consumers in many cases expect that certain products will be fortified insofar as protein content is concerned. As a result, the provision of a bland, edible protein supplement having the ability to increase the total protein content in foods in which it is embodied is of substantial importance.

Moreover, despite the ready availability of vegetable materials of high protein content, such as the oil seed proteins found in soybeans, corn, and peanuts, these materials have not been widely used because of the characteristic flavor or bitterness of the individual substance such as soybeans, peanuts, etc. A great deal of interest has been generated in attempting to develop means for treating such products to improve the palatability of these materials since the primary barrier to more extensive use of such materials in foods designed for humans has been the objection to taste and flavor. The "beany" and bitter taste which consumers detect in soybean products has inhibited any extensive use of such products in foods.

Attempts to eliminate or minimize these objectionable flavor elements in soybean products while insuring retention of the nutritional values characterizing such products have been numerous. It has been suggested that treatment of soybeans and soya flour with dilute acid and/or alkali solutions provides some decrease in the bitter flavor. High temperatures and/or pressures have been employed in the treatment of soybean products, both with and without gases such as sulfur dioxide, carbon dioxide, and other gases. Other procedures recommended involve the combination of moisture and heat in treating such products, but these procedures have been unsuccessful in producing a product having texture and which is free of the objectionable flavor components.

It is, therefore, an object of this invention to provide a bland, debittered protein food product having texture and freedom from beany and bitter taste.

Another object of the invention is the provision of a bland protein food product derived from vegetable materials having a high percent of water-insoluble protein and a chewy texture.

Still another object of the invention is the provision of a method for converting a high-protein vegetable material having a characteristic flavor to a form substantially free of such flavor and having a chewy texture.

Still another object of the invention is to provide an improved method for converting oil seed protein to the water-insoluble form and leaching said protein in the water-insoluble form to remove water-insoluble materials therefrom.

Additional objects if not specifically set forth herein will be readily apparent to those skilled in the art from the detailed description of the invention which follows.

Generally, the invention contemplates the treatment of defatted oil seed protein materials to convert the protein of said materials from the water-soluble to water-insoluble form and impart to such material a structural identity permitting leaching of the material to remove water-soluble materials therefrom. Such a procedure results in the production of a protein material which is completely bland in flavor and has a texture such that the particles must be subjected to a force in order to break down the large pieces. The product contains denatured protein and carbohydrate material and is highly satisfactory for use in food products inasmuch as a texture is imparted to the product before the protein is denatured. The texture permits utilization of the product in meat loaves, ham loaves, chili, stew, cereals, bread, etc., since it can be employed to supplement the protein content of such products and can be produced in a form simulating the texture of such products yet is bland and does not impart any flavor to such products. The bland product is the water-insoluble portion of defatted cooked soybean flour.

More particularly the invention involves the treatment of vegetable protein materials of the oil seed type by a series of steps designed to remove the characteristic flavor of the individual protein material and convert the protein material to a form having texture. The method involves cooking a dough of defatted oil seed protein under conditions which insure that the dough will assume an elastic form which will recover from distortion or deformation caused by pressure or stress and return to its original shape as distinguished from the flaccid or yielding form before such treatment. During this cooking step the protein content of the dough is converted from the water-soluble to water-insoluble form while undesired flavor elements and flavor precursors, as well as pigments remain in the water-soluble form. The product resulting from this cooking step is then contacted with an aqueous solvent and the water-soluble materials are extracted from the cooked protein product. While the method has particular application in connection with the treatment of soybean flour, it is also applicable in the manufacture of protein supplements from other vegetable protein products such as peanuts, zein, as well as other vegetable proteins which are in good supply, but have not been heretofore employed for this purpose because of flavor problems.

The protein source should be defatted and should be ground to a small particle size. Soybean flour is a very desirable source of protein for use in the instant process. Extracted soya flakes containing less than about 1% fat and ground to a particle size sufficient to pass a 65 mesh screen are particularly useful. The flakes should be desolventized prior to grinding, but the desolventizing operation should be one taking place under mild conditions; that is, there should not have been a heating of the flakes in the presence of water to a temperature sufficient to denature the protein. The flour should contain at least about 75% of the total protein as water-soluble protein as determined by the Biuret test. The flour can be characterized as a desolventized, untoasted, oil-free soybean flour.

The soybean flour is mixed with water to form a dough which can be shaped and formed for cooking. A dough containing about 40–60% flour with the remainder being water is very satisfactory for use in the invention. Larger water-to-flour ratios provide a fluid product which is not as easily handled as that containing the recommended amount of flour and water, while the use of less water results in the production of a dough which is somewhat crumbly and more difficult to form. Good mixing of the flour and water is recommended to obtain optimum binding by the soya protein and also to insure uniform distribution of the flour and water in the dough. The particle size of the flour used in forming the dough, as has been noted previously, should be sufficiently small to insure that the product will not have a gritty consistency resulting from the use of flours having larger particles. If the product is to be employed in foods where this gritty consistency is not objectionable, larger particle size flour can be employed as the starting material.

The natural pH of the dough is around pH 6.3 and in the preferred form of the invention pH of the dough is not altered. It is possible, however, by adjusting the pH of the dough to change the characteristics of the final product. If the dough is made more acid by the addition of acids which do not leave a toxic residue, such as lactic acid, acetic acid, and phosphoric acid, to adjust the pH to around 4.5–5.5, the final product is harder and more brittle than that resulting from a dough held at the natural pH of 6.3. A more alkaline dough having a pH around 8.5 is quite soft and mushy and the final product is much more frangible and can be broken down with less force or pressure than required for the product made from dough with a natural pH. The difference in the product appears to be attributable to the fact that the more alkaline material imbibes considerably more water than the acidic material. A dough having a pH of 8.5, for example, takes up approximately twice as much water as a dough having a pH in the range 4.5–6.3.

Shaping of the product prior to cooking can be carried out by hand or by any of the conventional means such as slicing, extrusion, molding, pressing, etc., to produce filaments, strands, strips, particles, etc. It is usually preferred to place the dough in a form which exposes the greatest amount of surface area in the subsequent cooking step. Thus, a greater proportion of the dough is exposed to elevated temperature and the cooking is more uniform.

The dough in the desired shaped form is then subjected to a source of live steam and cooked under pressure. The cooking step serves to coagulate the protein in the dough and convert water-soluble protein to the water-insoluble form. The live steam also serves to assist in volatilizing certain undesirable flavor components and serves to impart a structure to the dough. When the pressure is released at the completion of the cooking step, water within the mass of the dough is volatilized and escapes from the cooking vessel, along with other volatile materials. The product as a result of this escape of water from the interior of the dough assumes a cellular or spongy structure as a result of the swelling of the cooked dough when the pressure is released and water vapor is volatilized. The water which has been heated under pressure to a temperature in excess of its atmospheric boiling point is very volatile when the pressure is removed from the cooker.

Cooking can be carried out by introducing the shaped dough (strands, pellets, sheets, etc.) into a vessel capable of withstanding high pressures and exposing the dough to live steam under pressure. Pressures in the range around 5–50 p.s.i. are employed and cooking is carried out for a period of time sufficient to cook the protein, usually from around 5 minutes up to around 25 minutes. The temperature and time of cooking is dependent upon the particular form of the dough that is cooked with larger, thicker pieces requiring more severe cooking conditions. The live steam serves to raise the temperature of the dough and denature the protein in addition to preventing dehydration of the product during cooking. The water component of the steam is continuously added to the dough during the cooking step.

Release of the pressure in the cooking vessel can take place very quickly or over a period of several minutes. Rapid release of the pressure (a few seconds) insures that the water in the interior of the dough will be volatilized and the product will swell and have a cellular structure. This cellular structure provides a distinct advantage in that a far greater surface is provided in the dough. The porous structure is advantageous inasmuch as it provides for very efficient contact of the leaching solvent with all parts of the dough since the water can enter the interstices of the cellular structure. While the cooking step serves to denature the protein in the dough and render this protein water-insoluble, it does not appear to diminish the solubility of flavor materials, flavor precursors or pigments. The solubility of these materials in water and other polar solvents may even be increased as a result of the cooking step.

After removal of the cooked dough from the cooking vessel the strands, rods or pellets are further subdivided by slicing or grinding to produce pieces of a small size. The grinding or slicing or other comminuting step serves to provide a large number of freshly cut surfaces and serves to abrade the hard skin which develops on the surface of the product during the cooking operation. The skin provides something of a barrier to water or other solvent employed in the steeping step and, accordingly, for best results the skin layer should be broken down.

The ground or sliced product is then contacted with water or other polar solvent to leach the water-soluble materials from the cooked soybean flour. The subdivided cooked material is placed in hot water or other polar solvent and steeped or is washed with hot water or other polar solvent to remove water-soluble materials. The steeping or percolation step serves to extract water-soluble flavor substances, flavor precursors, some water-soluble proteins, carbohydrates, and coloring materials.

Steeping can be carried out by placing the denatured flour in water and heating the water to a temperature sufficient to extract undesirable flavor substances, coloring materials, etc. The temperature of the water can vary over a wide range with any temperature between about 32° F. and 212° F. being satisfactory. It will be apparent that lower temperatures require a much longer leaching time and also provide conditions under which growth of bacteria may be favored. Temperatures above about 150° F. prevent bacterial growth and allow for removal of the water-soluble materials in a reasonably short period of time. The upper limit on the temperature of the leaching step is governed to a certain degree by the boiling point of the leaching solvent. Usually when water is employed as the solvent it is preferred that the water be heated to around 150–180° F., although the temperature can be higher, up to around 212° F.

The mixture of denatured flour and solvent should be agitated to insure good percolation and completion of the leaching step in a reasonably short time. Where countercurrent contact of the solvent and denatured flour is employed, the liquid can be recycled to minimize the required volume of solvent. Usually an amount of solvent greater than the amount of denatured flour is used in the leaching step. The ratio of solvent to flour should be at least 2 parts solvent to each part denatured flour by weight. Around 4 parts solvent to each part of flour is preferred and solvent to flour ratios of 10–1 have been employed successfully. In the batch process, two steepings with a 10–1 water-to-flour mixture is about equal in effectiveness to three steepings with a 4–1 water-to-flour mix. Each steeping is carried out for about 15 minutes and the product is then rinsed for about 5 minutes in water. While the more drastic conditions of steeping, that is higher temperatures, greater solvent-to-solids ratio, and more steeps, provide a better flavored product, the texture is less desirable than that of a product processed under more moderate conditions.

Polar solvents, as well as water, can be employed in the leaching step to extract soluble proteins, bitter and beany flavor materials and pigments. Aqueous ethanol containing up to around 95% ethanol has been employed as the leaching solvent with good success. Where organic solvents are employed, it is usually advisable to follow the leaching step with a water rinse to remove traces of the organic solvent.

The steeped product is dried with hot air or by vacuum-drying or any other suitable drying technique to remove water and any other solvent, if this is desired. The temperature of drying preferably is 180–185° F. and the length of drying is not greater than about 4–6 hours. Higher temperatures and/or longer drying times yield a product with an undesirable flavor and a dark brown color. The dried material is then further subdivided, if desired, to a particle size suitable for inclusion into any of a number of food items.

The substantially debittered product contains around 70% or more of protein and is rated as "bland" by taste panel tests when compared with soybean flour not treated in accordance with the method of the invention.

The following examples illustrate specific embodiments of the invention:

Example I 550 grams of 60 mesh soybean flour was mixed for three minutes in a mixer with 450 grams of water. The resulting dough was passed through a food grinder equipped with a ¼ inch plate. The strands extruded from the grinder were placed on a screen in an autoclave. The temperature in the autoclave was raised to 121° C. with live steam. This temperature was maintained for 5 minutes. At the end of this time the pressure within the autoclave was released within 1 to 1½ minutes. The cooked strands were chopped in a food chopper to obtain smaller pieces and 100 grams of the cooked, chopped strands were placed in a beaker containing 900 grams of water heated to 180° F. The beaker contents were stirred occasionally for 15 minutes and the water then was poured off and replaced with an equal volume of fresh water at 180° F. The contents of the beaker again were stirred occasionally for 15 minutes at which time the water was poured off and replaced with an equal volume of fresh water at 180° F. This water was allowed to remain in contact with the cooked pieces of product for 3 minutes. At the end of this time the water was poured off and the particles were dried in a forced air oven at 180° F. for 2 hours. The dried particles were light tan in color and when rehydrated and tested they were found to be spongy and elastic and possessed no flavor.

Example II 550 grams of 60 mesh soybean flour was mixed for 3 minutes in a mixer with 450 grams of water. The resulting dough was passed through a food grinder equipped with a ¼ inch plate. The extruded strands were placed on a screen in an autoclave and the pressure raised to 15 p.s.i. with live steam. This pressure was maintained for 5 minutes and then released within 1 to 1½ minutes. The cooked strands were chopped in a food chopper to obtain smaller pieces. 100 grams of cooked strands were placed in a beaker containing 900 grams of 65% aqueous ethyl alcohol at 150° F. The beaker contents were stirred occasionally for 15 minutes and the alcohol then was poured off and replaced with an equal volume of fresh 65% ethanol at 180° F. The contents of the beaker were stirred occasionally again for 15 minutes and after this time the alcohol was poured off and replaced with an equal volume of fresh ethanol at 150° F. After 15 minutes of contact the alcohol was poured off and replaced with an equal volume of fresh water at 150° F. The beaker contents were stirred for 15 minutes at which time the water was poured off. The particles were dried in a forced draft oven at 180° F. for two hours. The dried particles were light tan in color and when rehydrated they were spongy and elastic and had no flavor or odor.

Example III 550 grams of 60 mesh soybean flour were mixed for 3 minutes in a mixer with 450 grams of water. The resulting dough was passed through a food grinder equipped with a ½ inch plate. The resulting strands were placed on a screen in the autoclave and the internal pressure of the autoclave was raised to 15 p.s.i. with live steam. This pressure was maintained for 15 minutes, at which time the pressure was then released within 1 to 1½ minutes. The cooked strands were chopped in a food chopper to obtain smaller pieces. 100 grams of the cooked strands were placed in a beaker containing 300 grams of water at 180° F. The beaker contents were stirred occasionally for 15 minutes, at which time the water was poured off and replaced with an equal volume of fresh 180° F. water. This leaching process was repeated three additional times. After the last leaching the water was poured off and the particle dried in a forced draft oven at 180° F. for 2 hours. The dried particles were found to be tan in color and when rehydrated and tasted the particles were spongy and elastic and possessed a slight cooked cereal flavor but possessed no bean flavor.

Example IV 550 grams of defatted peanut flour was mixed for 3 minutes with 450 grams of water in a mixer. The resulting dough was shaped into cubes and the cubes were placed on a tray in an autoclave. The temperature of the autoclave was raised to 121° C. with live steam and this temperature was maintained for 15 minutes. At the end of this time the pressure in the autoclave was released in approximately 20 seconds. The cooked product was diced into small pieces and 100 grams of the diced pieces were placed in a beaker containing 900 grams of water at 180° F. The contents of the beaker were stirred occasionally for 15 minutes and at this time the water was drained off. This steeping process was repeated three additional times. After the last steep water was drained off, the pieces of product were placed on a tray and dried in a forced draft oven for 18 hours at 185° F. The dried product was gray-white in color and when rehydrated had only a very slight taste.

The freedom from bitterness and characteristic flavor of the particular protein product is determined by a trained flavor panel. Various levels of bitterness or bean flavor are evaluated and numbers varying from No. 1, which indicates no detectable bitterness or soybean flavor, through No. 6, which characterizes very much bitterness or very much bean flavor, are noted by the panel. The numerical rating is as follows:

| Rating— | Amount of bitterness and/or flavor |
| --- | --- |
| No. 1 | No bitterness, no flavor. |
| No. 2 | Very little bitterness and/or flavor. |
| No. 3 | Little bitterness and/or flavor. |
| No. 4 | Moderate bitterness and/or flavor. |
| No. 5 | Much bitterness and/or flavor. |
| No. 6 | Very much bitterness and/or flavor. |

The particular protein product being tested is compared, insofar as flavor intensity is concerned, with that of a standard bland product having no bitterness or flavor.

Obviously many modifications and variations of the invention as hereinbefore set forth may be made without departing from the spirit and scope thereof and therefore only those limitations should be imposed as are indicated in the appended claims.

I claim:

1. A method for producing a bland protein product comprising: forming a dough of defatted soybean flour and water, subjecting said dough to conditions of heat and pressure whereby to cause volatilization of objectionable flavor components of said dough and convert the protein of said product to the denatured form, adding water to said dough during said heat and pressure treatment, releasing said pressure to impart an expanded porous structure to said denatured dough, and leaching said denatured protein product to remove water-soluble flavor materials from the interstices of said product.

2. A method for preparing a protein food product having a chewy texture and a bland flavor substantially free of beany taste from soybean protein comprising: heating defatted soybean flour dough under pressure to a temperature sufficient to substantially denature the protein of said dough, promptly releasing the pressure on said dough to provide an expanded denatured product having a greatly increased surface area and leaching by passing a solvent through the interstices of said product to remove flavor factors, color matter, and other water-soluble materials.

3. A method for preparing a substantially bland, high-protein food product comprising: heating under pressure a mixture of water and defatted soybean flour, said flour having at least 70% water-soluble protein, and said heating being carried out to a temperature sufficient to denature said protein, releasing said pressure so as to expand said product to increase the surface area thereof, and leaching said expanded product with an aqueous solvent to remove flavor substances and flavor precursors.

4. A method for preparing bland, denatured protein food additives comprising: forming a dough of 40–60% defatted soybean flour and water, shaping said dough in a form sufficient to expose a substantial portion of said dough and increase the surface thereof, subjecting said shaped dough to a pressure cooking operation to denature the protein of said dough and convert the dough to a spongy product having structure, adding water to said spongy product during said pressure cooking to avoid dehydration of said product, rapidly releasing said pressure and intimately contacting said product with an aqueous solution to extract water-soluble materials from said product by passing liquid through the interstices of said product.

5. A method for preparing a substantially bland protein food product having a texture such that particles of the product must be subjected to force in order to break down pieces thereof comprising: forming a dough of defatted soybean flour and water, subjecting said dough to heat and pressure, releasing said pressure so as to convert said dough to a form having a cellular structure of substantially denatured protein, and leaching said product with water to remove water-soluble materials therefrom.

6. A method for preparing a protein supplement for use in the preparation of food products from defatted soybean flour which comprises: forming a dough of said flour, cooking said dough with live steam under pressure to convert the protein of said dough to the water-insoluble form, and impart to said dough a chewy consistency, releasing said pressure, and intimately contacting said cooked product with water at an elevated temperature to extract water-soluble materials from said denatured product.

7. An elastic resilient vegetable protein product having an expanded cellular structure prepared in accordance with the method of claim 1.

8. A method for producing a palatable bland protein product comprising: forming a dough of defatted soybean flour and water, subjecting said dough to heat under pressure whereby to volatilize objectionable flavor elements of said dough and convert the protein of said dough to the water-insoluble form, terminating said heating and releasing said pressure whereby to impart a cellular structure to said dough, leaching said cellular dough product with water to remove water-soluble components from the interstices thereof and drying the leached product.

References Cited in the file of this patent
UNITED STATES PATENTS
3,047,395     Rusoff et al. _____ July 31, 1962